V. PINGRET.
ELASTIC FLUID MOTOR.
APPLICATION FILED NOV. 14, 1907.
901,258.
Patented Oct. 13, 1908.
4 SHEETS—SHEET 3.
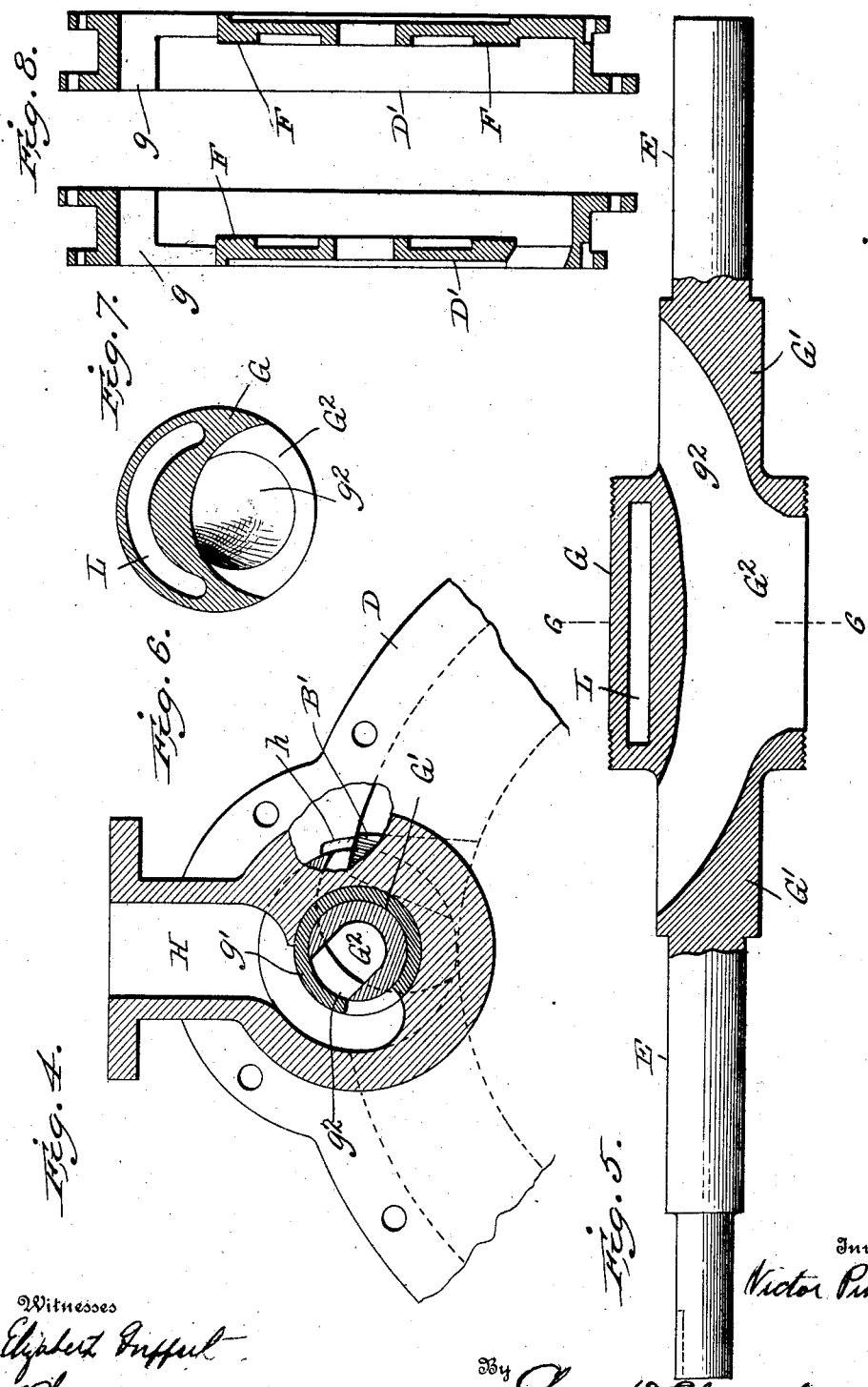

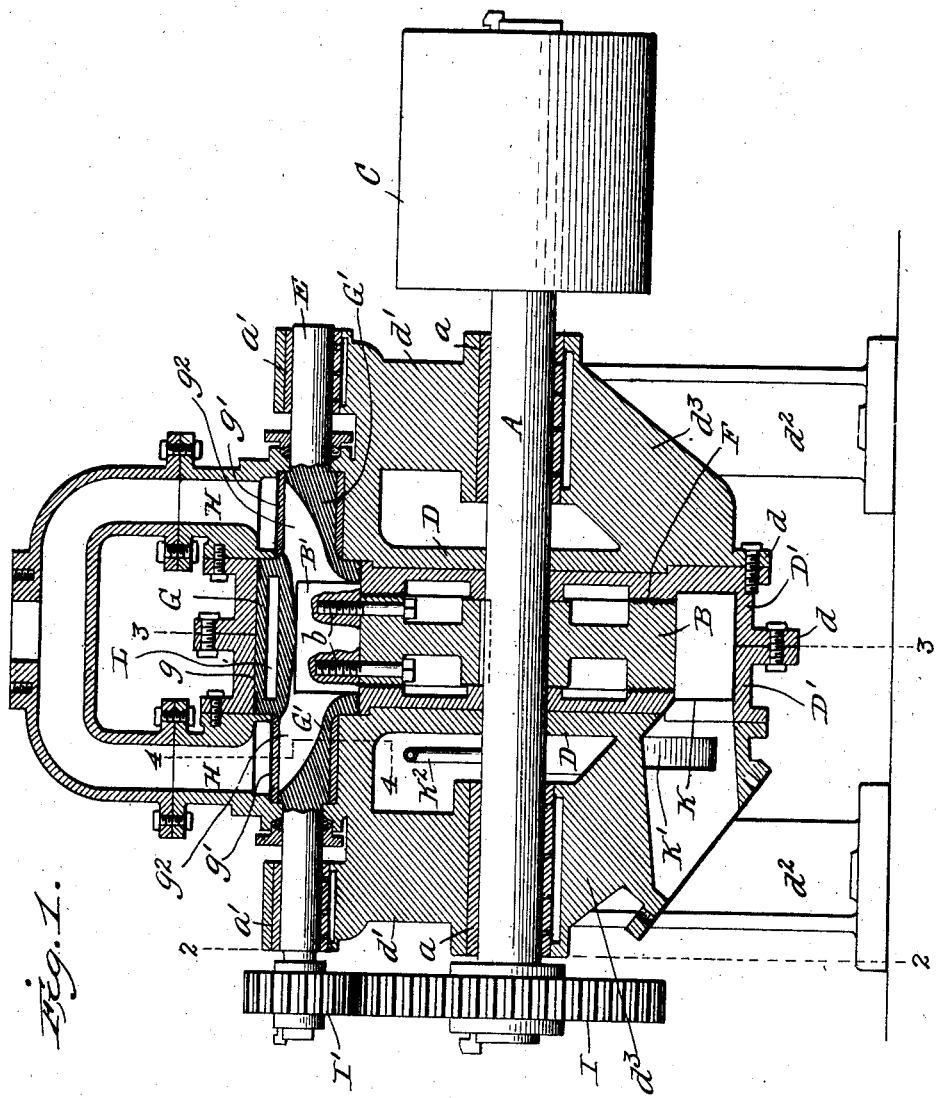

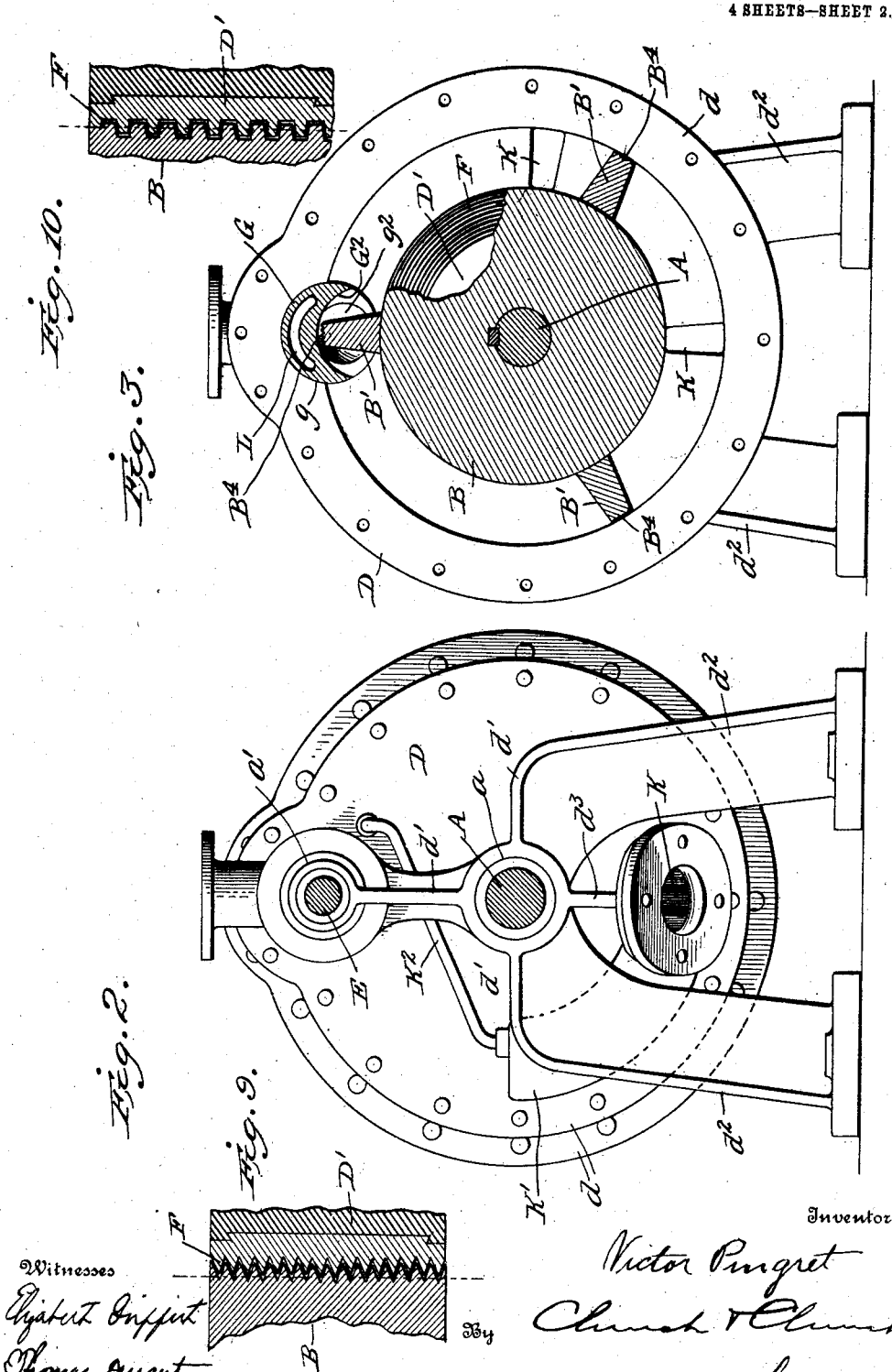

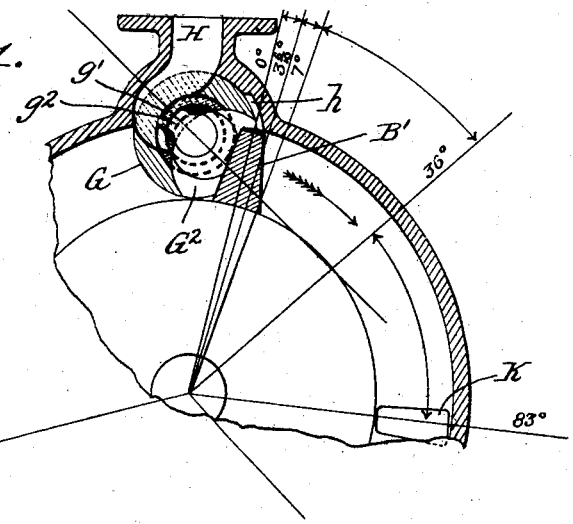
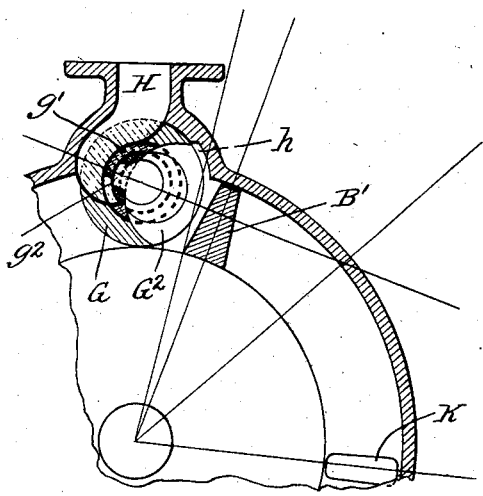
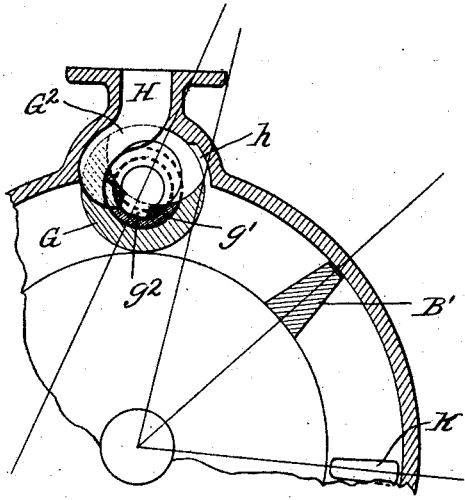

UNITED STATES PATENT OFFICE.

VICTOR PINGRET, OF RIO GRANDE DO SUL, BRAZIL.

ELASTIC-FLUID MOTOR.

No. 901,258.   Specification of Letters Patent.   Patented Oct. 13, 1908.

Application filed November 14, 1907. Serial No. 402,198.

*To all whom it may concern:*

Be it known that I, VICTOR PINGRET, a citizen of the Republic of Brazil, and a resident of Rio Grande do Sul, now temporarily residing at Toronto, Canada, have invented a certain new and useful Improvement in Elastic-Fluid Motors; and I do hereby declare the following to be a full, clear, and exact description of the same, reference being had to the accompanying drawings, forming a part of this specification, and to the figures and letters of reference marked thereon.

This invention relates to elastic fluid motors of that type wherein the elastic fluid acts on a rotary member or rotor, it being the object of the invention to produce a motor having few and simple moving parts and in which the *vis viva* of the elastic fluid due to momentum as well as its direct and expansive pressures, will be utilized to impart angular movement to the rotor.

A further object of the invention is to eliminate as far as practicable frictional contact between the parts and to utilize the forces developed in the elastic fluid by the conformation and movement of the parts to prevent loss of power through leakage.

In the accompanying drawings—Figure 1 is a vertical section in a plane taken axially of the rotating parts, the shafts being in elevation. Fig. 2 is an elevation of the motor on the line 2—2, Fig. 1. Fig. 3 is a vertical section on the line 3—3, Fig. 1. Fig. 4 is a vertical section on the line 4—4, Fig. 1, one portion being broken away. Fig. 5 is an enlarged sectional elevation of the valve. Fig. 6 is a section on the line 6—6, Fig. 5. Figs. 7 and 8 are sectional views of the right and left halves of the casing or cylinder. Fig. 9 is a detail of one form of joint for resisting passage of steam through the same. Fig. 10 is a view similar to Fig. 9 but showing another form of joint. Figs. 11, 12 and 13, are diagrammatic views showing the operation of the valve and piston.

Like letters in the several figures indicate the same parts.

In said drawings A indicates the main shaft which carries the rotor B and power pulley C or other means whereby the power developed on the rotor may be transmitted and utilized. The casing or stator is formed sectional on planes at right angles to the axis of the shaft, thus in the particular motor shown there are two outside sections D formed with bearings $a$, $a'$ for the shaft A and valve shaft E, respectively, and two inside sections D' forming the cylinder in which the rotor operates. The meeting faces of the sections D D' are made to match and fit together by planes of circular contour with the axis of the shaft as a center, whereby the finishing of such faces becomes a simple lathe manipulation not requiring the use of special tools. The parts are united by bolts in radial edge flanges $d$. The bearings for the shaft and valve are united by relatively thin webs $d'$, extensions of such webs forming the legs or supports $d^2$, but it will be noted that the bearings while rigidly connected by the webs are spaced away from the inner faces or bodies of the sections and are only connected thereto by relatively thin webs $d^3$ whereby the bearings will be kept cool, or at least will not be unduly heated by conduction from the cylinder. The cross sectional conformation of the cylinder itself is not material, but is preferably rectangular as shown and adapted for the reception of similarly shaped blades, abutments or pistons B' forming part of the rotor, the attachment between the rotor and pistons being formed by bolts $b$ (Fig. 1) passing through the rim of the rotor and into the parts B'.

The rim of the rotor and lands of the sections D' corresponding in width to the rim are provided with a multiplicity of intercalated annular projections F, preferably of V-section although they may be of substantially rectangular or only slightly tapering section, as shown in Fig. 10. These intercalated projections are small the relative size being much exaggerated in the drawings in order that they may be seen and while they may contact with each other, practice has demonstrated that this is not necessary or desirable, inasmuch as under working conditions and when the rotor has attained even the moderate speed of a few hundred revolutions per minute there is no appreciable leakage of steam toward the axis of the rotor. This effect is due in part, I believe, to centrifugal force acting on the steam which becomes entrained between the intercolated projections, causing it to act as a barrier to the entrance or passage of steam through between the surfaces, although the result is also due in part to the frictional resistance to the passage of the steam through a tortuous passage such as is formed by the projections.

While three blades or pistons are shown on the rotor in the accompanying drawings, I have shown but one abutment or valve in the casing, as in this particular engine it is desired to have but a single section of the cylinder constitute the working area.

The abutment or valve is cylindrical in cross section. Its central portion G which is of the larger diameter works in a chamber $g$ formed in the parts D' and constitutes the abutment. At each end of the portion G are axial extensions G' working in sleeves $g'$, preferably of brass, mounted in the casing. The central part G of the valve is formed with a curved recess $G^2$ for the passage of the blades or pistons and leading from this central recess are two inlet nozzles $g^2$, passing through the extension G' and opening at their outer ends in position to register with corresponding ports or openings in the sleeves $g'$, as best shown in Fig. 4. These nozzles or inlet passages are of a tapering form, i. e., their cross sectional area increases toward the discharge end, whereby increased velocity is imparted to the steam as it enters the cylinder. The inlet ports are so formed and positioned (see Figs. 11, 12 and 13) that steam will be admitted in full volume when the blade has passed and the abutment has turned a distance sufficient to close the cylinder behind the abutment and the admission of steam may be prolonged by forming recesses $h$, in the upper wall of the cylinder, as shown in Fig. 4. The abutment makes rolling contact with the periphery of the rotor between the blades and except when a blade is passing, forms a complete barrier to the escape of steam from the rear end of the working area of the cylinder. Motion is imparted to the valve and abutment through gears I I', said gears being so proportioned that the large central part or abutment proper will have the same surface speed as the periphery of the rotor. At each end of the recess, the abutment is provided with relatively fine grooves and projections, preferably of V-section to form a steam packing and the blades are similarly formed on all faces moving against or in proximity to stationary parts as shown at $B^4$ in Fig. 3.

The exhaust from the cylinder takes place through ports K leading into a passage K' preferably formed in one of the outer casing sections, two of said ports being provided to insure a free exhaust and sufficient drainage at the bottom of the cylinder. Compression as the blades or pistons approach the abutment is relieved through a small exhaust pipe connection $K^2$ best seen in Fig. 2.

Inasmuch as the valve is rotary and works at high speed in order to secure practically an explosive effect on the blade or piston of the rotor, it becomes important that it should be perfectly balanced, therefore it is cored out as at L, Figs. 5 and 6, to give a balanced distribution of the metal in the body of the valve.

The intercalated projections may be formed in accordance with well known shop practice in a lathe, but it is preferred that the projections and recesses on one part only be formed in the manner stated and as shown in Figs. 9 and 10 a recess be formed in the coöperating part into which recess molten fusible metal M may be poured, when the parts have been assembled or brought into substantially the position they will occupy when in operation. By this means the projections are formed to match perfectly and where the projections are of tapering section when the parts are separated slightly, there will be no mechanical friction by contact of the proximate faces, but at the same time a maximum resistance will be offered to the flow of elastic fluid through between the parts. In all cases each recess forms at the bottom a chamber or pocket into which the steam expands and by which its velocity is checked.

The operation of the steam on the piston will be best understood from Figs. 11, 12 and 13, thus as the parts reach the position shown in Fig. 11, i. e., the piston just closing the cylinder in front of the abutment, the valve begins to open and the entering steam acts by impact against the piston throughout a movement of the latter equal to about 7 degrees of its circle of movement. With the construction shown the steam will begin to act by direct pressure when the piston has moved 7 degrees and will continue to so act until the piston has moved 36 degrees, at which time the valve closes and from 36 degrees to 83 degrees the steam acts expansively. The exhaust port is located at the 83rd degree line. The arrangement of the ports in the valve is such that the steam is directed full against the face of the piston enabling the impact force to be utilized during a period when the pressure in the cylinder would not augment rapidly enough to increase the power developed on the shaft.

What I claim as new and desire to secure by Letters Patent, is:—

1. An elastic fluid motor embodying a rotor having a piston thereon, a casing forming a cylinder for the piston, a rotary abutment having a recess for the passage of the piston and inlet passages leading into said recess from both ends of the abutment whereby pressure on the abutment is equalized and means coöperating with said inlet passages to form a valve controlling the admission of elastic fluid.

2. An elastic fluid motor embodying a rotor having a piston thereon, a casing forming a cylinder for the piston, a rotary abutment having a recess for the passage of the piston, and axial projections on each end of the abutment with inlet passages leading from the recess through both the axial extensions and means coöperating with said axial extensions to form valves controlling the admission of elastic fluid.

3. An elastic fluid motor embodying a rotor having a piston thereon, a casing forming a cylinder for the piston, a rotary abutment having a recess for the passage of the piston, axial projections on each end of the abutment and inlet passages of increasing cross sectional area leading through the extensions and into the recess at opposite ends of the abutment and means coöperating with the extensions to form valves controlling the admission of elastic fluid.

4. In an elastic fluid motor, the combination with the rotor, of a stator or casing formed of two inner and two outer sections assembled axially of the rotor and connected by peripheral flanges, a shaft for the rotor, bearings for the shaft located in the outer sections only of the stator, and a rotary abutment also journaled in said outer sections parallel with the rotor axis.

5. In an elastic fluid motor the combination with the rotor, of a stator or casing formed of two inner and two outer sections, the inner sections having the cylinder formed in their proximate sides and all of said sections being connected by peripheral flanges, a shaft for the rotor, bearings for the shaft located in the outer sections, a rotary abutment having reduced axial extensions forming a shaft, bearings for the abutment shaft also located in said outer sections and webs connecting the shaft bearings with the bodies of the outer sections, whereby said bearings are rigid with but remote from the cylinder.

6. In an elastic fluid motor the combination with the rotor having a piston thereon and the casing having the cylinder therein, of the rotary abutment having the recess for the passage of the piston and inlet passages leading from said recess through the extensions and sleeves surrounding said extensions and having ports therein for coöperation with the passages to form valves controlling the admission of steam.

7. In an elastic fluid motor, the combination with the casing having a cylinder therein and a rotor having a piston working in said cylinder, of a means for preventing the escape of pressure between the rotor and casing embodying a series of annular projections on one of the proximate faces and a coöperating fusible metal face molded by said projections to form intercolated annular projections on the rotor and casing respectively.

8. In an elastic fluid motor, the combination with the casing having a cylinder therein and a rotor having a piston working in said cylinder, of a means for preventing the escape of pressure between the rotor and casing and embodying a series of annular projections on one of the proximate faces, a recess in the opposing face and fusible metal molded in position by said projections and walls of the recess; substantially as described.

VICTOR PINGRET.

Witnesses:
W. H. FRONE,
W. J. CONDLON.